(12) United States Patent
Nayak et al.

(10) Patent No.: US 7,679,864 B2
(45) Date of Patent: Mar. 16, 2010

(54) NARROW WIDTH ACTUATOR FOR TAPE DRIVE SYSTEMS

(75) Inventors: Ashok Nayak, Glendora, CA (US); John Ycas, Boulder, CO (US); Turguy Goker, Solana Beach, CA (US); Ming-chih Weng, Los Angeles, CA (US); James Mark Decot, Fountain Valley, CA (US)

(73) Assignee: Quantum Corporation, San Jose, CA (US)

( * ) Notice: Subject to any disclaimer, the term of this patent is extended or adjusted under 35 U.S.C. 154(b) by 793 days.

(21) Appl. No.: 11/506,968

(22) Filed: Aug. 17, 2006

(65) Prior Publication Data

US 2007/0285845 A1    Dec. 13, 2007

Related U.S. Application Data

(60) Provisional application No. 60/804,223, filed on Jun. 8, 2006.

(51) Int. Cl.
*G11B 5/55* (2006.01)
(52) U.S. Cl. .................................................. 360/261.1
(58) Field of Classification Search ... 360/261.1–261.3, 360/291
See application file for complete search history.

(56) References Cited

U.S. PATENT DOCUMENTS

| | | | | |
|---|---|---|---|---|
| 5,371,636 | A * | 12/1994 | Nayak et al. ................... 360/75 |
| 5,377,052 | A * | 12/1994 | Guzman et al. ........... 360/261.1 |
| 5,566,039 | A * | 10/1996 | Spicer ...................... 360/261.1 |
| 5,793,573 | A * | 8/1998 | Eckberg et al. ........... 360/261.3 |
| 5,936,804 | A * | 8/1999 | Riener et al. .............. 360/244.9 |
| 5,949,619 | A * | 9/1999 | Eckberg et al. ............. 360/291 |
| 6,075,678 | A | 6/2000 | Saliba |
| 6,404,598 | B1 | 6/2002 | Nayak et al. |
| 6,411,474 | B1 | 6/2002 | Anderson |
| 6,594,118 | B1 | 7/2003 | Nayak et al. |
| 6,697,229 | B2 | 2/2004 | Tamura et al. |
| 6,704,169 | B2 * | 3/2004 | Nawa ....................... 360/261.3 |
| 6,765,759 | B2 | 7/2004 | Bhattacharya et al. |
| 7,123,450 | B1 * | 10/2006 | Villiard et al. ............ 360/261.1 |
| 7,227,724 | B2 * | 6/2007 | Nayak et al. .............. 360/261.1 |
| 7,359,259 | B2 * | 4/2008 | Poechmueller .............. 365/198 |
| 7,420,781 | B2 * | 9/2008 | Nayak et al. .............. 360/261.1 |
| 7,474,495 | B2 * | 1/2009 | Weng et al. ............... 360/77.13 |
| 2002/0041470 | A1 * | 4/2002 | Nayak et al. .............. 360/261.1 |
| 2002/0060884 | A1 * | 5/2002 | Nawa ....................... 360/261.3 |
| 2004/0184195 | A1 * | 9/2004 | Nayak et al. .............. 360/261.1 |

* cited by examiner

*Primary Examiner*—William J Klimowicz
(74) *Attorney, Agent, or Firm*—Baker Botts L.L.P.

(57) ABSTRACT

A servo-controlled, head actuator design that has low profile characteristics in both the height and width dimensions. The low height allows the actuator to fit into a half-high tape drive form factor. Additionally, in some implementations, the actuator comprises a smaller, concentrated moving mass coupled with a flexure construction having a narrowed width with added ribs for torsional stiffness. These aspects of the actuator provide a higher second mode of vibration compared to the flexure designs of the prior art. The actuator includes a coarse actuator assembly for larger movements of the head, and a fine actuator, including a Voice coil motor, responsive to analysis of servo signals. In some embodiments, the voice coil motor of the fine actuator and the coarse actuator shafts are in line. Since the centerlines of the shafts are in-line with the voice coil motor, the resonance response of the shaft spring-mass system is reduced.

16 Claims, 10 Drawing Sheets

NARROW WIDTH ACTUATOR FOR TAPE DRIVE SYSTEMS

CROSS-REFERENCE TO RELATED APPLICATIONS

This application claims the benefit of U.S. Provisional Patent Application No. 60/804,223 filed on Jun. 8, 2006, which is incorporated herein by reference.

BACKGROUND

Linear Tape-Open ("LTO") is a computer storage magnetic tape format developed as an alternative to the proprietary Digital Linear Tape ("DLT") format. The LTO roadmap calls for successive increases in capacity and speed. Due to these targets and the need to maintain, and perhaps shrink, a small drive housing form-factor, printed circuit board real estate is becoming very valuable as the need to include additional components increases. Due to this, it is becoming challenging to fit various drive mechanisms, included in previous generation LTO drives, into newer designs.

Designing high bandwidth tracking servo systems, for use in LTO drives, presents the following technological challenges: high bandwidth amplifiers, faster sample rates for digital control algorithms, control of loop shaping to achieve robust and higher performance suppression capabilities, improved feedback sensors and high bandwidth actuators. Although each one of these is an important design or engineering task, the performance of the actuator basically limits the final tracking servo bandwidth. As a result, the actuator is often considered to be the most important requirement.

As discussed in more detail below, the claimed embodiments are directed to high bandwidth actuators. Some of the issues with high performance actuators are: minimizing moving mass, optimization of the working lateral range of motion and controlling the high order unwanted resonance frequencies above a minimum frequency that is determined based on the tracking servo bandwidth requirements.

In addition, drive form factors (for example LTO form factor requirements) and installation/mounting requirements are also a concern. Some computer industry requirements include the drive mounting configurations. For example, some computer manufactures specify a drive-mounting configuration requirement that the drive can be mounted on its lateral side or on its bottom side. The side-mounting configuration requires two sets of hole-patterns with a minimum screw length that will support the drive in a computer chassis. A typical screw length requirement is about 4 to 5 millimeters. In a LTO half-high drive (½ of the standard height of 3¼ inches) the pin threading mechanisms must be spaced away from the mounting screw. Thus, the actuator must fit between the pin threading mechanisms and the drive reel located in the back. The actuator must also fit in the limited space in the width dimension. Prior art actuator assemblies are typically not suitable for tape drives with smaller form factors where drive components are more tightly packed. In addition, some of the actuator configurations of the prior art force a lower 1st mode resonance frequency response at around 100 Hz. Generally, a lower 1st mode of the spring-mass system also results in a lower 2nd mode of resonance.

In view of the foregoing, a need exists in the art for a high bandwidth actuator that meets the above-described technological requirements.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, apparatuses and methods which are meant to be exemplary and illustrative, not limiting in scope. In various embodiments, one or more of the above-described problems have been reduced or eliminated.

One embodiment by way of non-limiting example provides for a servo-controlled, head actuator design that has low profile characteristics in both the height and width dimensions. The low height allows the actuator to fit into a half-high tape drive form factor. The construction of the actuator, in one embodiment, reduces the width of the tape drive system, and allows the industry standard mounting with the necessary screw length. Additionally, in some implementations, the actuator comprises a smaller, concentrated moving mass coupled with a flexure construction having a narrowed width with added ribs for torsional stiffness. These aspects of the actuator provide a higher second mode of vibration compared to the flexure designs of the prior art. The actuator design includes a coarse actuator assembly for larger movements of the head, and a fine grain actuator, including a voice coil motor, responsive to analysis of servo signals. In some embodiments, the voice coil motor of the fine actuator and the coarse actuator shafts are in line. Since the centerlines of the shafts are in-line with the voice coil motor, the resonance response of the shaft spring-mass system is reduced.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

The following embodiments and aspects thereof are described and illustrated in conjunction with systems, apparatuses and methods which are meant to be exemplary and illustrative, not limiting in scope.

Figure 1:
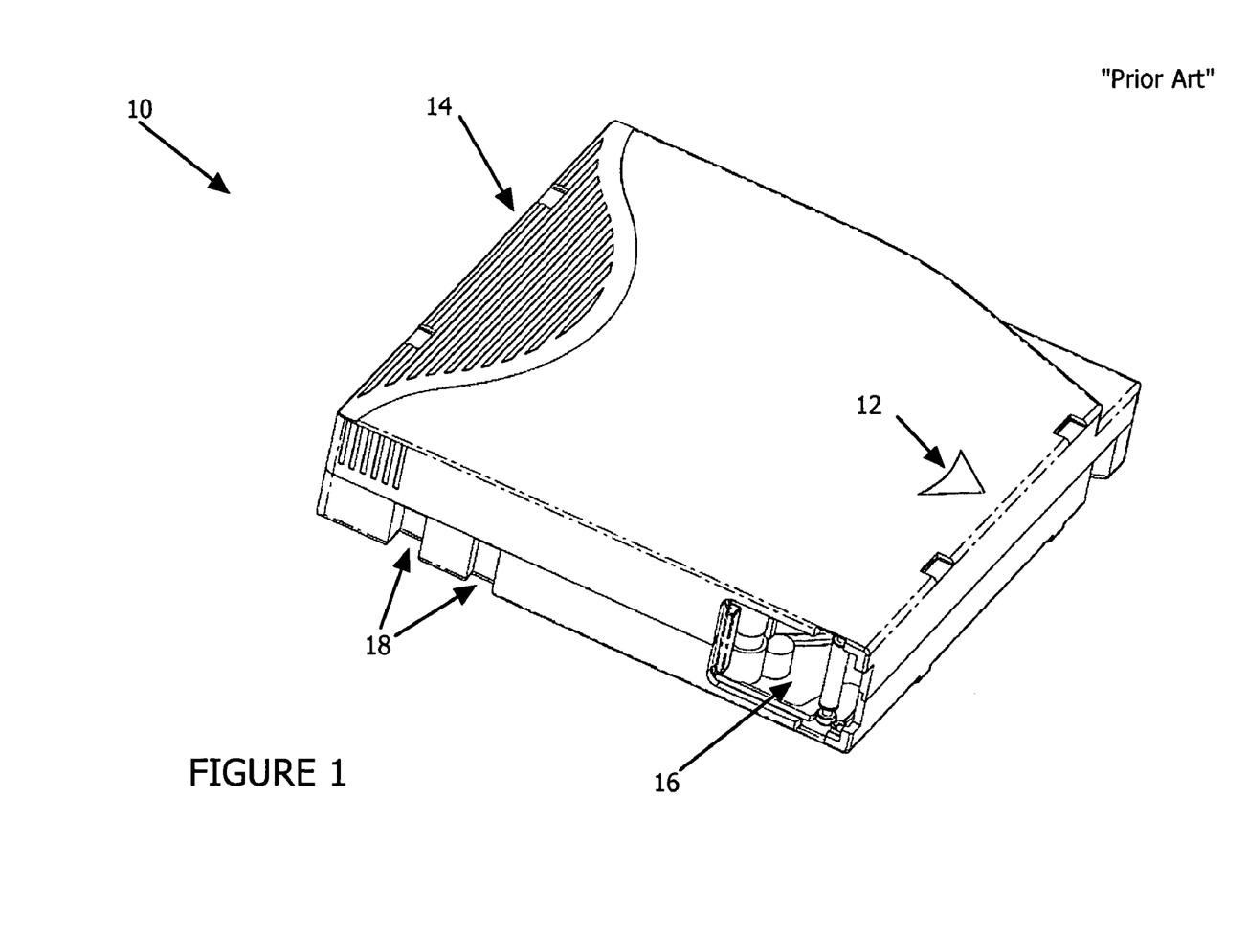
FIG. 1 illustrates a typical LTO tape cartridge.
Figure 2:
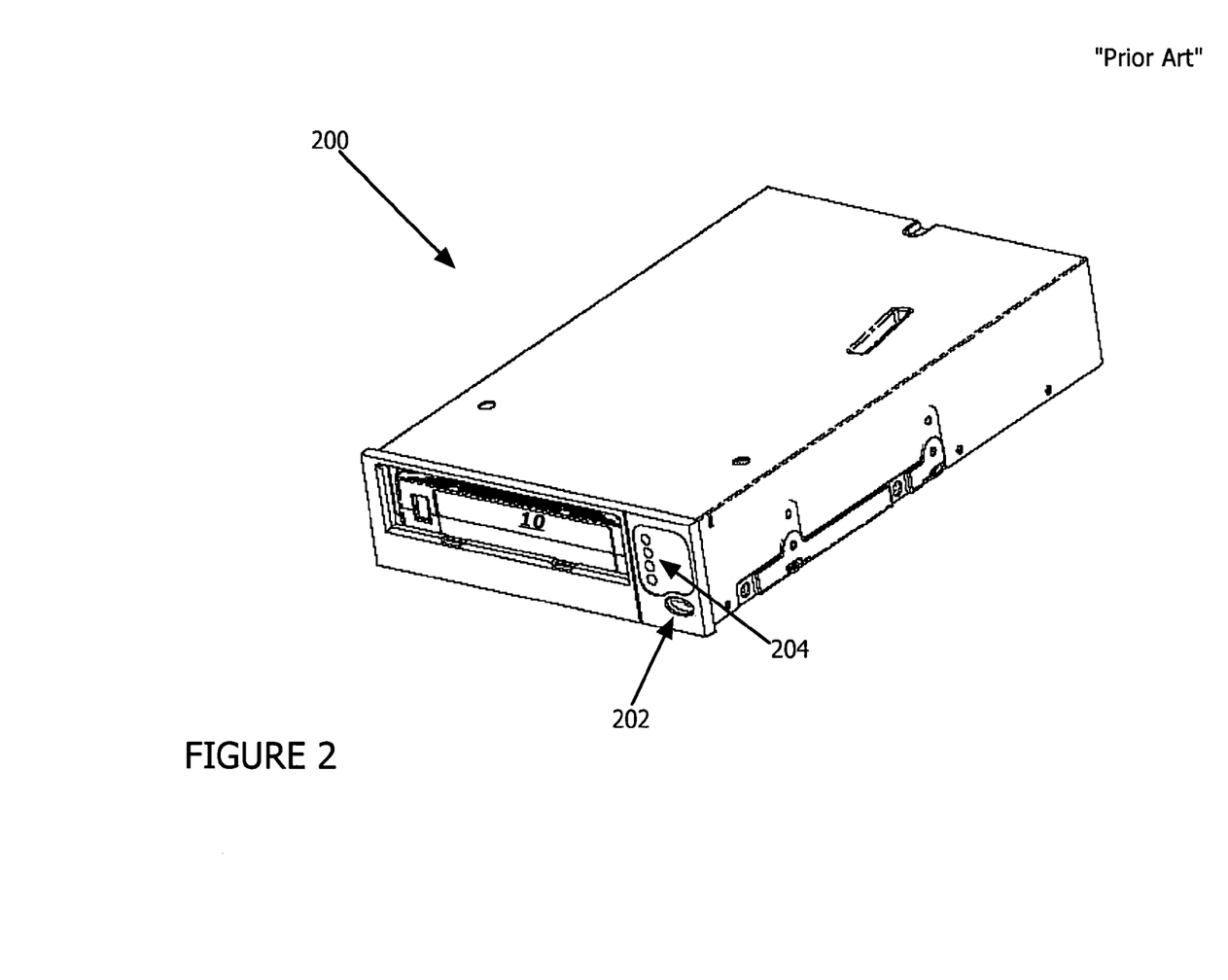
FIG. 2 illustrates a typical LTO tape drive housing with the cartridge of FIG. 1 inserted.

FIG. 1 illustrates a typical LTO tape cartridge 10 and FIG. 2 illustrates a typical LTO tape drive housing 200 with the cartridge 10 of FIG. 1 inserted. Cartridge 10 is inserted into drive 200 in a direction specified by arrow 12. Cartridge 10 also includes grip lines 14 for easy handling. Additionally, cartridge 10 includes various lock depressions 18 (also repeated on the opposite side) that mate with a male counterpart, in drive 200, to ensure a snug fit after cartridge 10 is inserted into drive 200. Drive 200 includes an eject button 202 and various indicators 204. The drive 200 may be designed to fit into a 5.25 inch form factor for installation into a bay of a desktop or server box. Of course, other implementations are possible. For example, the drive 200 may be a stand-alone unit, such as a desktop drive that is external from a host computing system.

Figure 3:
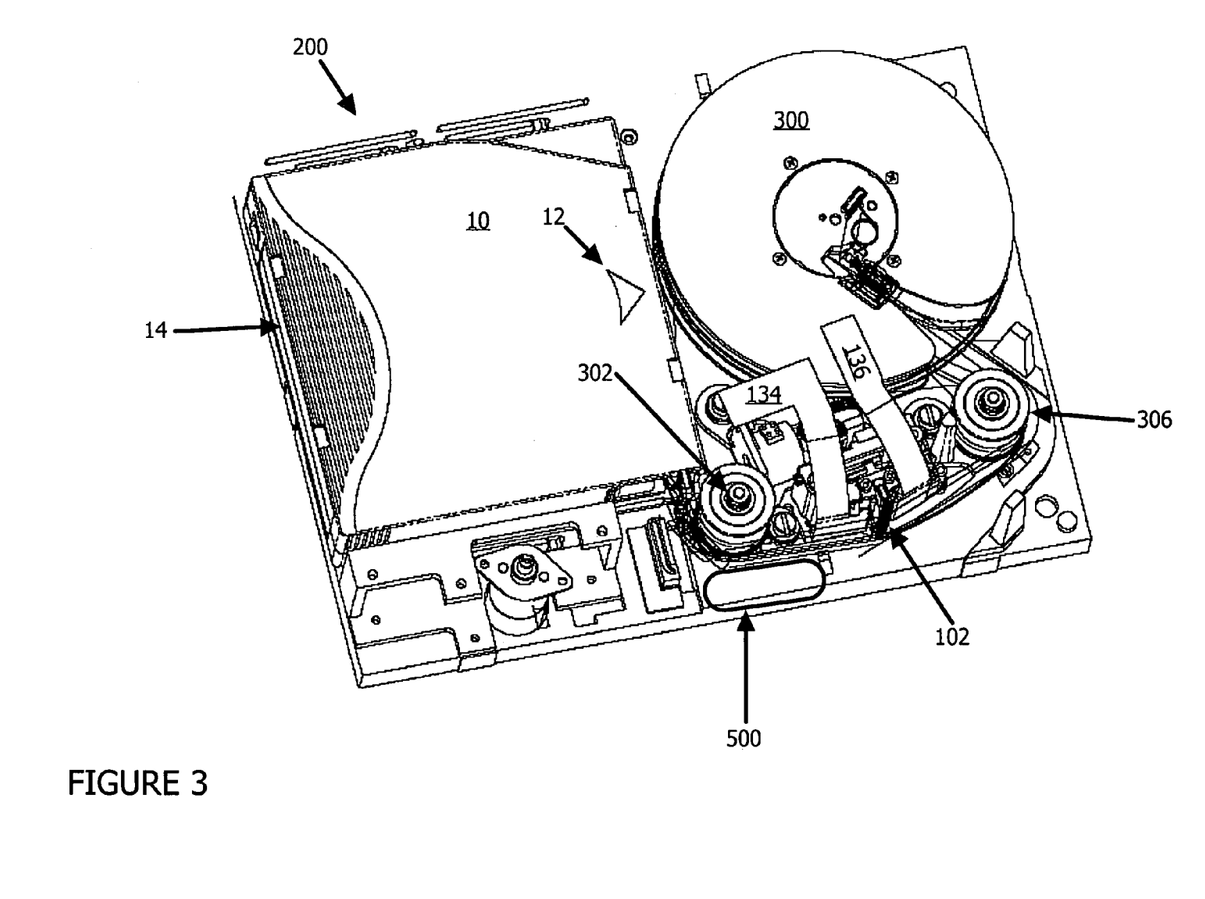
FIG. 3 is a top-down view of the cartridge inserted into the tape drive which includes a head actuator assembly of the claimed embodiments.

FIG. 3 is a top-down view of the cartridge 10 inserted into the tape drive 200 which includes a head actuator assembly of the claimed embodiments. A full description of the various components of drive 200 is intentionally not included in order to not unnecessarily obscure the claimed embodiments. However, some of the major components include a take-up hub 300, various tape-threading roller guides (302, 306), magnetic head 102 and flex cables (134, 136). Drive 200 will also typically contain one or more processors, a memory and a controller. Area 500 will be referred to later.

Figure 4:
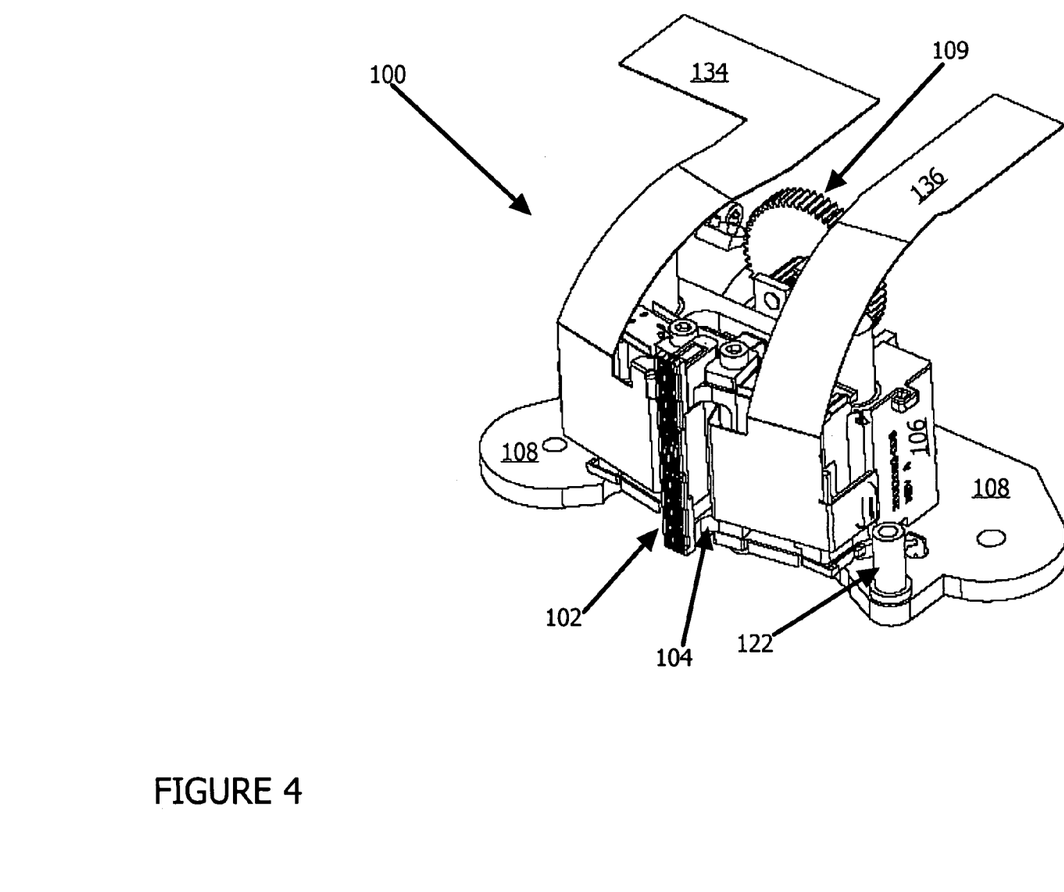
FIG. 4 is a perspective view of an actuator assembly, in accordance with an exemplary embodiment.
Figure 5:
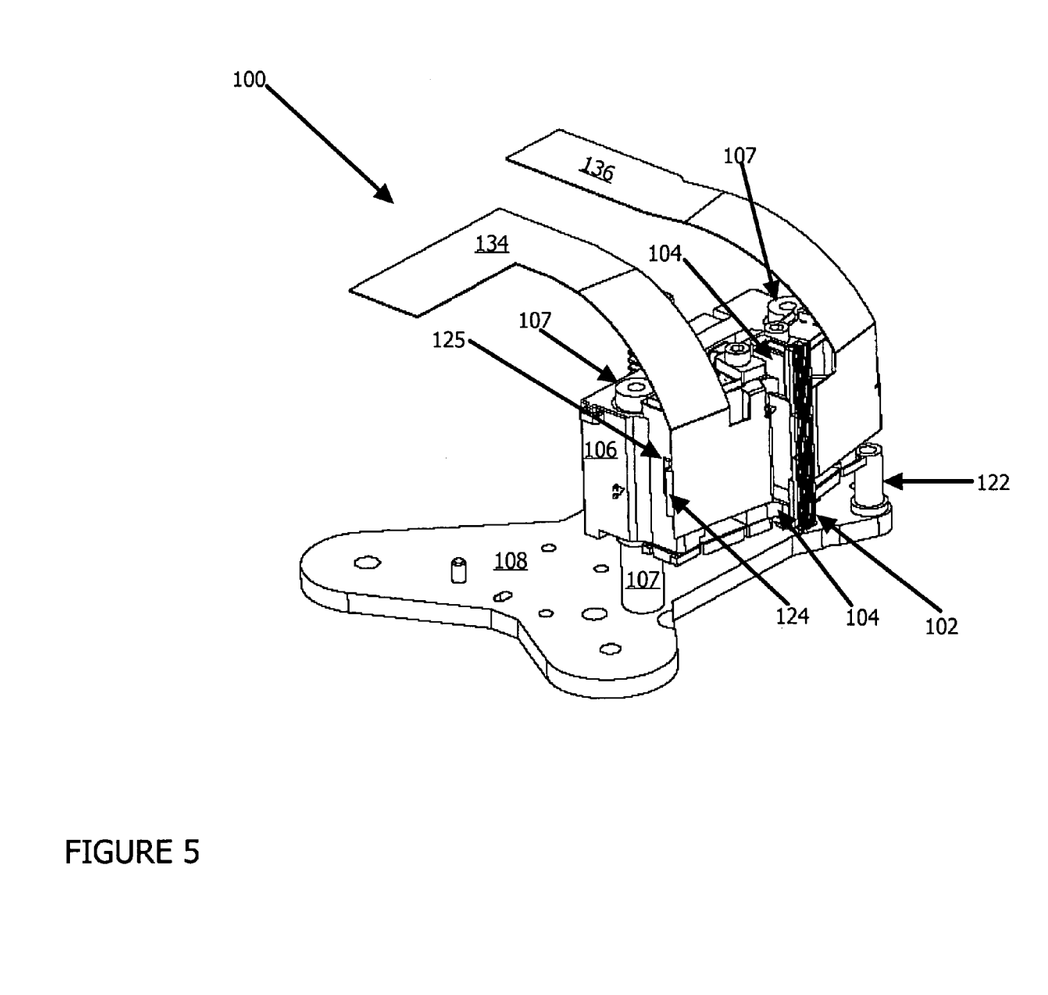
FIG. 5 is an alternative perspective view of the actuator assembly, in accordance with an exemplary embodiment.
Figure 6:
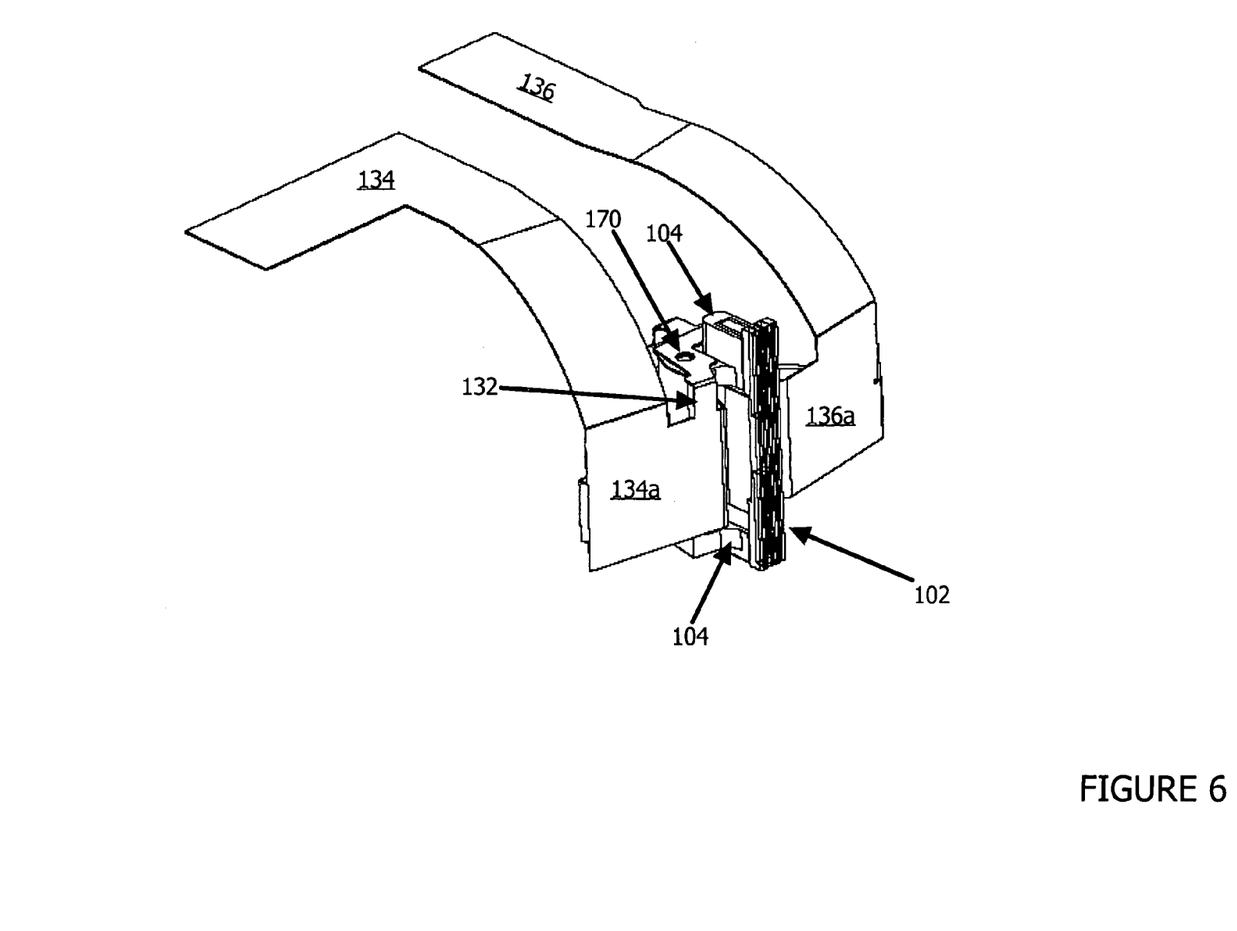
FIG. 6 is a perspective view detailing a magnetic head and fine-grain actuator assembly, in accordance with an exemplary embodiment.

FIGS. 4 and 5 show a head actuator assembly 100 comprising a magnetic head 102, and a head carriage 104. The magnetic head 102 is preferably retained in a forked shaped portion 103 (see FIGS. 8A and 9) of the head carriage 104 preferably by an adhesive. Of course other types of fasteners may be used to fasten the magnetic head 102 to the head carriage 104 such as an interference fit or mechanical fasteners such as screws, for example. The actuator assembly 100, illustrated in FIGS. 4 and 5, further includes a coarse actuator and a fine actuator. In one implementation, the head carriage 104 is operably attached to the fine actuator, while the fine actuator is attached to the coarse actuator. In one implementation, the coarse actuator comprises an actuator base 106 (to which the head carriage 104 and fine actuator are attached). The coarse actuator, in one implementation, includes a drive assembly 109 that displaces the coarse actuator base 106 along shafts 107 that protrude from base plate assembly 108. The second shaft 107 is located on an opposite side of magnetic head 102. In one implementation, the coarse actuator translates the entire fine actuator assembly across the tape for a travel distance of about 9 mm to, for example, move magnetic head 102 between tracks. Magnetic head 102 may include one to several bumps and each bump will usually include a plurality of read and write elements.

Figure 7:
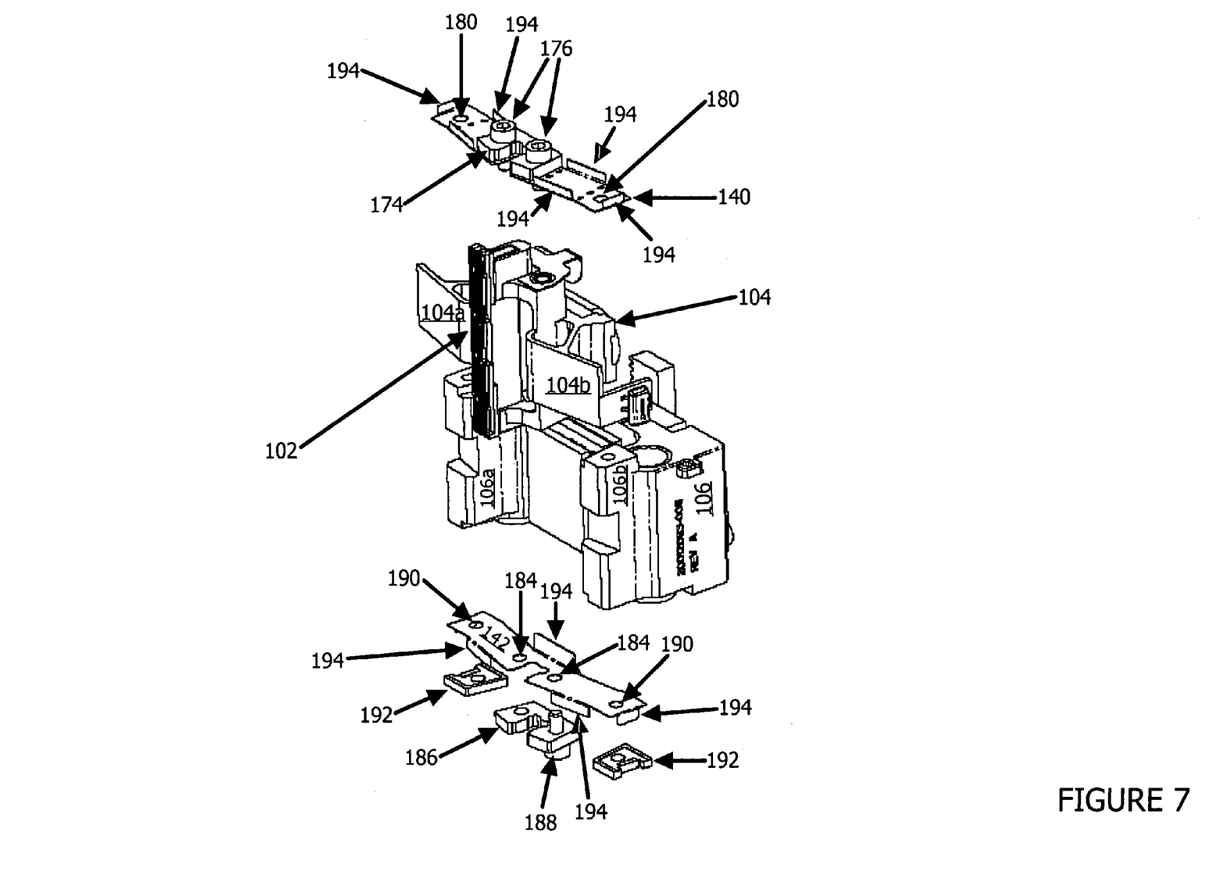
FIG. 7 is an exploded view illustrating various components of the actuator assembly, in accordance with an exemplary embodiment.
Figure 8A:
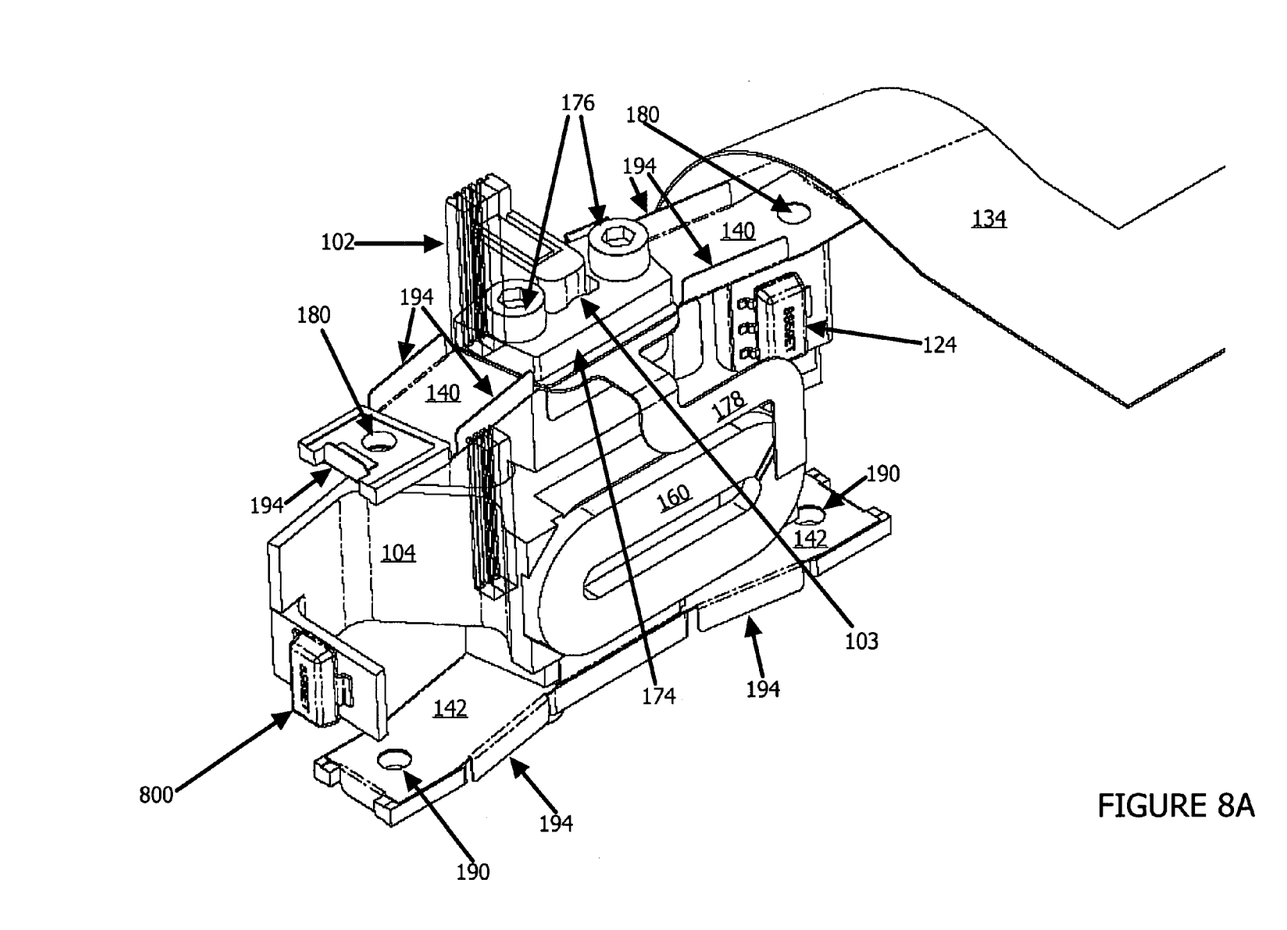
FIGS. 8A and 8B are exploded views illustrating some of the components of the fine actuator, in accordance with an exemplary embodiment.
Figure 8B:
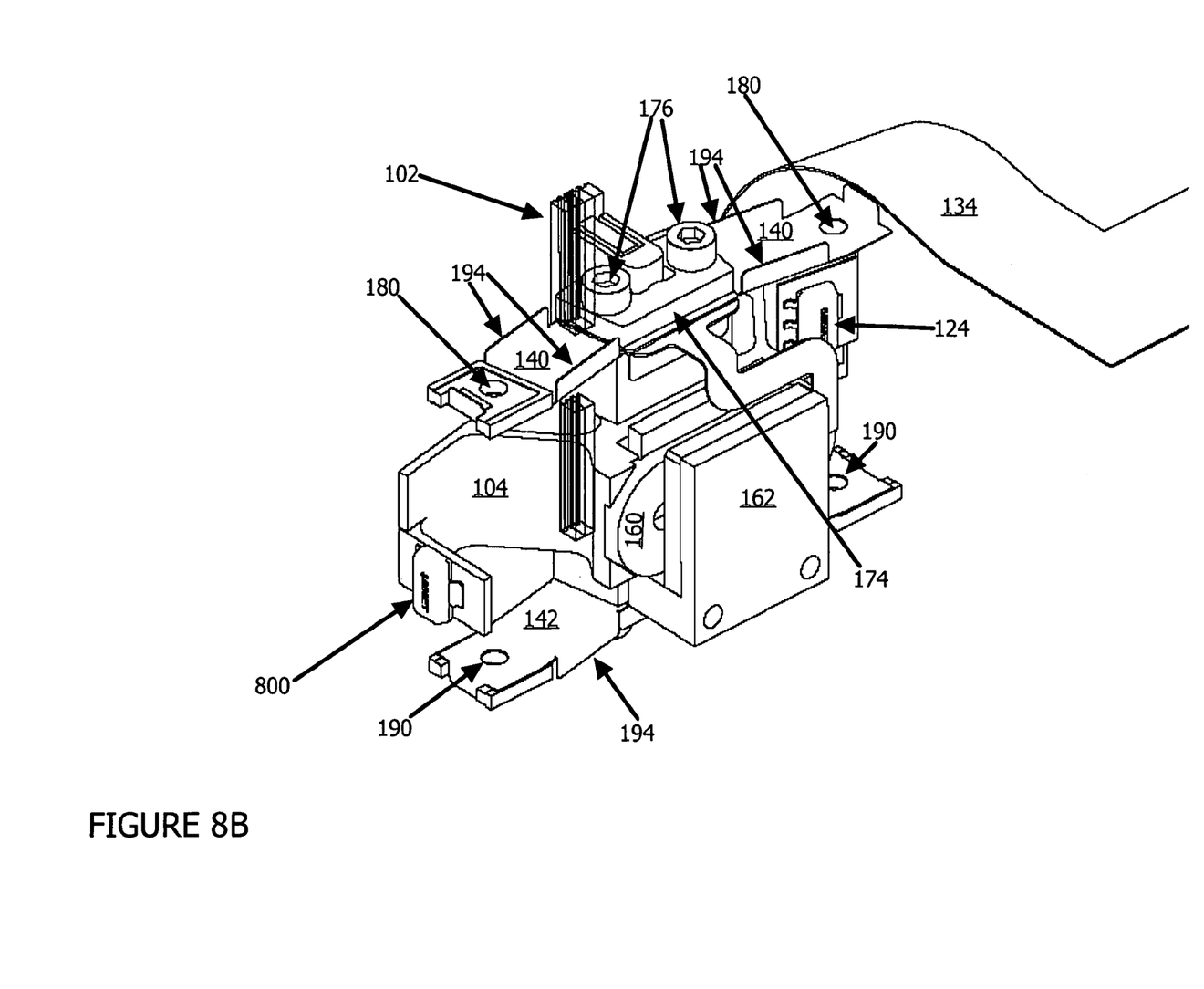
Figure 9:
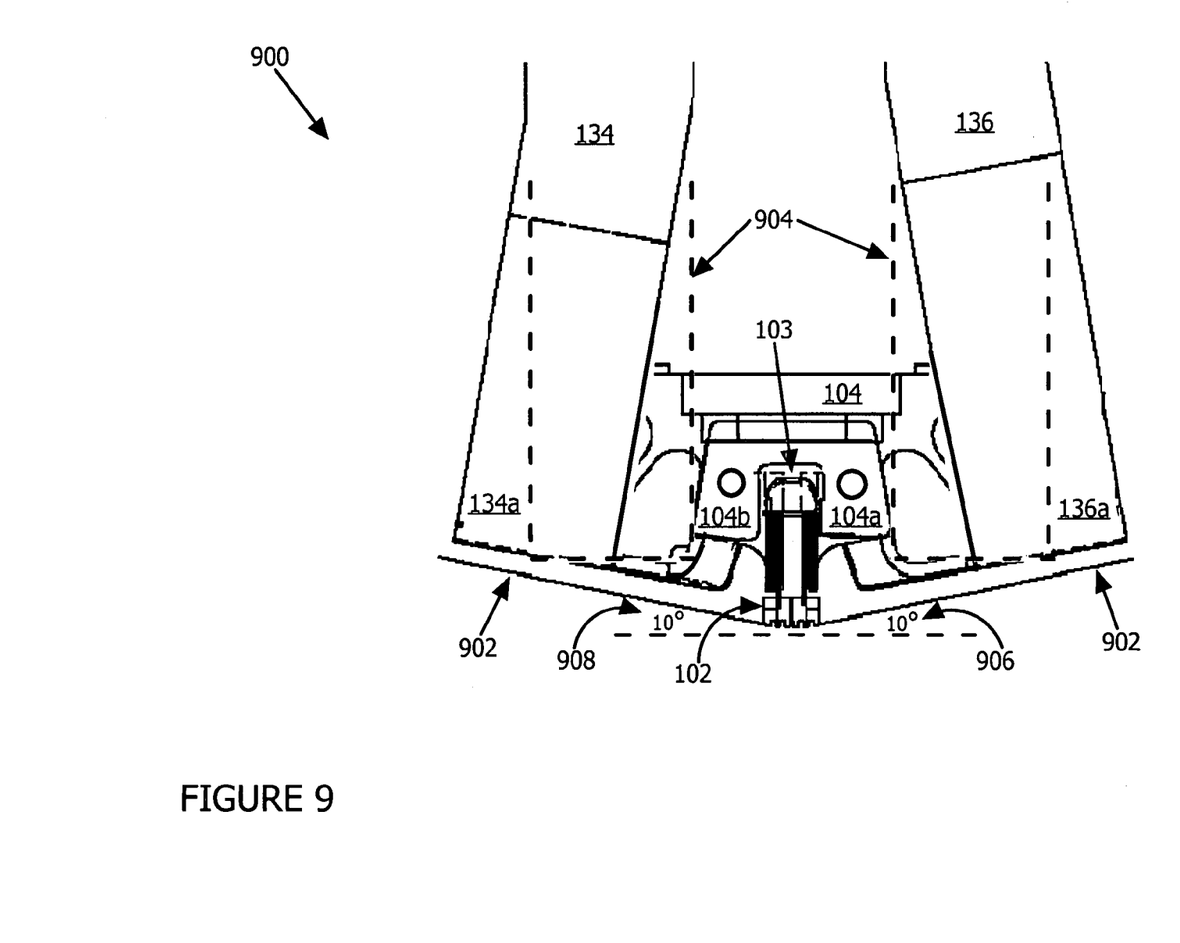
FIG. 9 is a top-down block diagram view illustrating flexible circuit orientation in relation to a tape travel path, in accordance with an exemplary embodiment.

It should be noted that the phrases "fine actuator" and "moving mass" can be used interchangeably and generally refer to the following collection of parts: coarse actuator base 106, head carriage 104, magnetic head 102, voice coil motor 160 and top and bottom flexure springs (140,142/refer to FIGS. 7-8B). Additionally, the phrase "coarse actuator" generally refers to the following collection of parts: base plate assembly 108, shafts 107, drive assembly 109 and the coarse actuator base 106.

The fine actuator controls the head carriage assembly 102/104, relative to coarse actuator base 106, using a voice coil motor (VCM) assembly (see FIGS. 8A & 8B). The voice coil motor assembly includes a voice coil portion 160 and magnetic housing assembly 162. The voice coil portion 160 is attached to the head carriage 104 to translate with the head carriage 104, while the outer portion 162 is attached to the coarse actuator base 106. In one implementation, the VCM of the fine actuator is a flat voice coil motor. The voice coil portion 160 is suspended in a magnetic field produced by one or more magnets in the magnetic housing assembly 162 of the voice coil motor. In one implementation, the fine actuator moves magnetic head 102 based on analysis of the servo signals, contained on a tape, to keep the magnetic head 102 in substantial alignment with a selected track. The voice coil motor assembly and associated magnets located in the magnetic housing assembly 162 are oriented relative to the direction of travel of the coarse actuator base 106. This configuration also contributes to a reduced actuator assembly 100 size. In one implementation, the fine actuator functions under closed loop servo control, while the coarse actuator utilizes open loop control.

The trigger point of the reference hall sensor magnet assembly 122 provides a known location for the head with respect to tape. The linear hall sensor magnet 124 (see FIG. 5) along with the reference hall sensor magnet assembly 122 provides the translation information of the fine actuator. In one implementation, this information is used to provide the damping of the first mode resonance of the spring-mass system of the fine actuator.

Regarding the reference hall sensor 800 (refer to FIGS. 8A and 8B) and the reference hall sensor magnet assembly 122 (refer to FIGS. 4-5), during a read-write process of the tape drive 200, the magnetic head 102 traverses across a tape width to seek a relevant track. There are a number of incidents when the magnetic head 102 is parked at a given known/reference location. Such events may include booting up the tape drive 200, tape-loading sequence, etc. In order to send the magnetic head 102 to this reference location, the reference hall-sensor magnet assembly 122 and reference hall sensor 800 are utilized. The reference hall magnet assembly 122 is secured to the actuator base plate 108 and the reference hall sensor 800 is secured to the coarse base actuator 106. The actuator base plate 108 is stationary to the drive 200. Thus, when the reference hall sensor 800 arrives in the vicinity of the reference hall magnet assembly 122, the reference hall sensor 800 is triggered. This information is utilized to locate the magnetic head 102 with respect to the tape.

In reference to the linear hall sensor 124 and an associated dual pole magnet 125, the fine actuator of the head actuator assembly 100 is utilized to keep the head on a track under a servo control. It should be noted that the dual pole magnet 125 is only partly visible in FIG. 5. Any movements in the tape or head carriage 104 can create a misalignment between a read/write element of the magnetic head 102 and a corresponding track on the tape. The linear hall sensor 124 is attached to the flex cable 134 which is attached to the head carriage 104. The corresponding dual pole magnet 125 is attached to the coarse actuator base 106. When the head carriage 104 moves, the linear hall sensor 124 will also move with respect to the dual pole magnet 125. The dual pole magnet 125 has two poles—north and south. When the linear hall sensor 124 is aligned to a null line of the dual pole magnet, there is no signal. When the magnetic head 102 moves up, the linear hall sensor 124 produces the signal which is proportional to the head-translation. The same is true when the magnetic head 102 moves in the negative direction. As a result, the linear hall sensor 122 provides the signal which is proportional to the head translation. This information can be used in number of ways. Some examples include 1) damping of the servo loop and 2) when tape is at the end and it reverses the direction to move from forward to reverse, there is no servo information from the tape. The linear hall sensor 124 provides the head location information during this phase.

With reference to FIGS. 6-8B, flex cables (134, 136) are each attached to one of a pair of laterally extending arms (104*a*, 104*b*) of head carriage 104. In one implementation, the flex cables (134, 136) are attached to the laterally extending arms (104*a*, 104*b*) via an adhesive. Flex cables 134 and 136 provide the electrical connection between the magnetic head 102 and a printed circuit board (not shown). The head flex circuit portion 132 also connects to the voice coil 160 via pad 178. The screws 176 going through clamp 174 provide the force between the pads of the voice coil flex cable portion 132 and the VCM 160 for electrical continuity. This eliminates any need to provide additional wires between the voice coil and the main PCB (not shown). Thus, in this implementation, the voice coil 160 terminates at the main PCB via the traces in the flex cable 134.

Top flexure spring 140 further includes holes 180 that are utilized to secure top flexure spring 140 to the coarse actuator base 106 via additional screws (not shown). In one implementation, clamps may also be included with the screws. It should be noted that FIG. 7 is an exploded view of various parts. As such, top flexure spring 140 is shown on one side of flex cables 134 and 136 for clarity. FIGS. 8A and 8B correctly characterize the placement of top flexure spring 140 in relation to flex cables 134 and 136.

As the head carriage 104 is secured to top flexure spring 140 via screws 176 and the top flexure is further secured to the coarse actuator base 106 via screws (not shown), it can be seen that head carriage 104 is mounted between opposing arms (106*a*, 106*b*) in area 103 of the coarse actuator base 106. Head carriage 104 is also coupled to the actuator base 106 via a bottom flexure spring 142. Similar to top flexure spring 140, bottom flexure spring 142 is coupled with the head carriage 104 at an inner set of holes 184 via a clamp 186 and screws 188 (note only one screw 188 is intentionally included in FIG. 8A for clarity of the view). Bottom flexure spring 142 is further coupled to the coarse actuator base at holes 190 via clamps 192 and screws (not shown).

Actuator assembly 100 has two separate resonance frequency vibration modes referred to as the first mode and the second mode. The first mode refers to up and down frequency vibrations of the actuator assembly and is generally low frequency. The second mode refers to torsional frequency vibration of the moving mass and is generally preferred to be kept as high as possible and preferably five to eight times higher than the closed-loop bandwidth frequency.

Top and bottom flexures springs 140 and 142 each further include various ribs 194 that are oriented perpendicular to each flexure. In one implementation, the top and bottom flexure springs 140 and 142 are metal springs that apply opposing forces to bias the head carriage 104 towards a center position relative to the fine actuator thus providing a resonance frequency dampening effect. In one implementation, flexure springs are 140 and 142 are made from 300 series stainless steel. The ribs 194 allow for reductions in the width of top and bottom flexure springs 140 and 142 while maintaining desired spring forces. This is accomplished because ribs 194 add torsional stiffness to the top and bottom flexure springs 140 and 142. Since the width of the flexures is reduced, the overall size of the actuator assembly 100 can be reduced accordingly to fit into a smaller drive enclosure. As previously indicated, it is also desirable to maintain a high second resonance mode. The placement of the top and bottom flexure springs 140 and 142 help to contribute the high second mode of vibration. The top and bottom flexure springs 140 and 142, in one implementation, are mounted to be substantially aligned with the center of gravity of the moving mass corresponding to the fine actuator. This can be seen, for example, via FIGS. 8A-8B wherein the top and bottom flexure springs 140 and 142 are arranged at the top and bottom of head carriage 104 such they coincide at a lateral midpoint of head carriage 104 wherein the lateral midpoint divides head carriage 104 into front and back parts. It should also be noted that since the top and bottom flexure springs 140 and 142 are inline with the moving mass, the ribs 194 are also in-line with the moving mass. As a result, the ribs therefore also help to contribute to a higher second resonance mode.

Furthermore, under servo control, the voice coil motor 160 is electrically coupled with a corresponding magnetic circuit that generates a force required to move the magnetic head 102 such that it stays aligned with a particular track on a tape. A magnetic moment caused by the force can also excite the shafts 107 and their associated spring-mass system. Since the voice coil 160 is in-line with the shafts 107, the residual force of the moment arm is substantially zero and the resonance of the shaft's spring-mass system is also reduced substantially.

Another advantage of the claimed embodiments is that the flex cables 134 and 136 are mounted parallel to the tape travel path and this allows for further separation of the two flex cables. Laterally extending arms (104*a*, 104*b*/refer to FIG. 7) are configured in a manner that defines the orientation of the flex cables (134, 136) such that the flex cables (134, 136) are parallel to the tape travel path. It is desirable to keep the flex cable as far apart as possible in order to minimize electrical interference between the two flex cables 134 and 136. This aspect of the claimed embodiments is further explained via FIG. 9 which is a top-down block diagram view 900 illustrating flexible circuit orientation in relation to a tape travel path. Included in top-down view 900 are the flex cables 134 and 136, a portion of the head carriage 104, magnet head 102, tape/tape travel path 902 and prior art flex cable orientations 904. As can be seen, the flex cable portions (134*a*, 136*a*/also refer to FIG. 6) of the flex cables (134, 136) are parallel to the tape/tape travel path 902. The laterally extending arms (104*a*, 104*b*) extending of the head carriage 104 are oriented substantially parallel to the tape path in the opposing regions proximal to magnetic head 102. This configuration allows the physical distance between the flex cables 134 and 136, as they extend from the flex cable portions 134*a* & 136*a*, to be increased. This increased separation reduces the effects of interference or noise associated with a read signal traversing flex cable 136 caused by, for example, write signals traversing flex cable 134. If the flex cables (134, 136) were not oriented parallel to the tape/tape travel path 902, the distance between the flex cables (134, 136) would decrease as can be seen via prior-art flex cable orientations 904. Furthermore, prior art flex cable orientations 904 are additionally limited in that there is very little room to further separate the two orientations 904 from each other. This is due to the fact that if either orientation 904 is moved away from the other, the flex cable will move into the area of the tape/tape travel path 902. Orienting the flex cables (134, 136) parallel to the tape/tape travel path 902 resolves this deficiency of prior art tape drive systems.

In one implementation, laterally extending arms (104*a*, 104*b*) form approximately 10 degree angles at either side of fork-shaped portion 103 as indicated by areas 906 and 908. Since the flex cables (134, 136) are attached to the laterally extending arms (104*a*, 104*b*), flex cable portions 134*a* and 136*a* (refer to FIG. 6) therefore also are oriented about 10 degrees inward in relation to the magnetic head 102.

Advantageously, the claimed embodiments provide for a reduced fingerprint actuator assembly capable of fitting into next generation LTO tape drives. Additionally, a higher second mode vibration is achieved by placing flexures with ribs inline with the moving mass/fine actuator. Furthermore, the reduced footprint actuator assembly provides the required extra room in a tape drive housing for tape grabber mechanics as well as providing the option to install the housing in various orientations due to multiple sets of mounting holes for screws. More specifically, area 500 of drive 200 (refer to FIG. 3) is freed up to allow for additional mounting screw holes.

Another advantage of the claimed embodiments is that a flat voice coil motor design is employed by the claimed embodiments. Prior art voice coils are typically circular. Using a circular voice coil results in an increased fine actuator moving mass. That increase in mass necessitates the use of wider flexures. In turn, wider flexures results in an enhanced width for the actuator as a whole. By using a flat voice coil, those prior art issues are avoided. Additionally, the flat voice coil contributes to the moving mass being concentrated in a small area which in turn helps to achieve the in-line/center of gravity aspects of the claimed embodiments.

While a number of exemplary aspects and embodiments have been discussed above, those of skill in the art will recognize certain modifications, permutations additions and sub-combinations thereof. It is therefore intended that the following appended claims and claims hereafter introduced are interpreted to include all such modifications, permutations, additions and sub-combinations as are within their true spirit and scope.

What is claimed is:

1. An actuator assembly for use in a tape drive, comprising an actuator base having first and second arms;
a head carriage assembly including one or more magnetic read/write heads wherein the head carriage assembly has a center of gravity;
a flat-shaped voice coil motor assembly including a flat-shaped voice coil and a magnetic housing assembly, the flat-shaped voice coil being attached to the head carriage assembly on a side opposing the one or more read/write heads to translate the head carriage assembly, the magnetic housing assembly being attached to the actuator base such that at least a portion of the voice coil and at least a portion of the head carriage assembly are positioned between the first and second arms of the actuator base;
a top flexure spring;
a bottom flexure spring;
wherein the top and bottom flexure springs are attached to the first and second arms at opposing ends thereof;
wherein the head carriage assembly is attached to the top and bottom flexure springs such that head carriage assembly is between the first and second arms of the actuator base; and
wherein the top and bottom flexure springs are substantially aligned with the center of gravity of the head carriage assembly.

2. The actuator assembly as recited in claim 1 wherein the head carriage assembly further comprises first and second laterally extending arms on corresponding opposite sides of the one or more magnetic read/write heads, the first and second laterally extending arms extending substantially parallel to a tape travel path along respective regions of the tape travel path immediately adjacent to laterally extending portions of the laterally extending arms.

3. The actuator assembly as recited in claim 1 wherein the top and bottom flexure springs each include at least one set of opposing ribs that extrude perpendicularly from opposing lateral sides of the top and bottom flexure springs.

4. The actuator assembly as recited in claim 1 further comprising:
a base;
at least one coarse actuator shaft mounted on a top portion of the base wherein the actuator base is slidably adapted to travel along the at least one actuator shaft; and
a drive assembly for driving the actuator base along the at least one actuator shaft.

5. An actuator assembly for use in a tape drive, comprising an actuator base having first and second arms;
a head carriage assembly including one or more magnetic read/write heads and one or more motor elements wherein the head carriage assembly has a center of gravity;
a top flexure spring;
a bottom flexure spring;
first and second laterally extending arms;
first and second flex cables;
wherein the top and bottom flexure springs are attached to the first and second arms at opposing ends thereof;
wherein the head carriage assembly is attached to the top and bottom flexure springs such that head carriage assembly is between the first and second arms of the actuator base;
wherein the top and bottom flexure springs are substantially aligned with the center of gravity of the head carriage assembly;
wherein the first and second laterally extending arms are each on opposite sides of the one or more magnetic read/write heads;
wherein the first and second laterally extending arms extend substantially parallel to a tape travel path along respective regions of the tape travel path immediately adjacent to laterally extending portions of the laterally extending arms;
wherein the first and second flex cables are coupled to the one or more magnetic read/write heads;
wherein a first portion of the first flex cable is attached to the first laterally extending arm such that the first portion of the first flex cable is substantially parallel to the tape travel path along a region of the tape travel path immediately adjacent the first portion; and
wherein a second portion of the second flex cable is attached to the second laterally extending arm such that the second portion of the second flex cable is substantially parallel to the tape travel path along a region of the tape travel path immediately adjacent the second portion;
wherein distal ends of the laterally extending portions of the laterally extending arms and distal ends of the first and second portions of the first and second flex cables are oriented inward relative to a plane defined by the tape travel path in the region of the tape travel path immediately adjacent the one or more magnetic read/write heads.

6. The actuator assembly as recited in claim 5 wherein the top and bottom flexure springs each include at least one set of opposing ribs that extrude perpendicularly from opposing lateral sides of the top and bottom flexure springs.

7. The actuator assembly as recited in claim 5 further comprising:
a base;
at least one coarse actuator shaft mounted on a top portion of the base wherein the actuator base is slidably adapted to travel along the at least one actuator shaft; and a drive assembly for driving the actuator base along the at least one actuator shaft.

8. The actuator assembly as recited in claim 5 wherein the one or more motor elements is a voice coil motor assembly.

9. The actuator assembly as recited in claim 8 wherein the voice coil motor assembly includes a flat-shaped voice coil motor.

10. The actuator assembly as recited in claim 9 wherein a voice coil motor flex cable is electrically coupled to the voice coil motor which is also electrically coupled to a portion of the first or second flex cables.

11. An actuator assembly for use in a tape drive, comprising
an actuator base having first and second arms;
a head carriage assembly including one or more magnetic read/write heads and one or more motor elements wherein the head carriage assembly has a center of gravity;
a top flexure spring;
a bottom flexure spring;
first and second laterally extending arms;
first and second flex cables;
wherein the top and bottom flexure springs are attached to the first and second arms at opposing ends thereof;
wherein the head carriage assembly is attached to the top and bottom flexure springs such that head carriage assembly is between the first and second arms of the actuator base;
wherein the top and bottom flexure springs are substantially aligned with the center of gravity of the head carriage assembly;
wherein the first and second laterally extending arms are each on opposite sides of the one or more magnetic read/write heads;
wherein the first and second laterally extending arms extend substantially parallel to a tape travel path;
wherein the first and second flex cables are coupled to the one or more magnetic read/write heads;
wherein the first flex cable is attached to the first laterally extending arm; and
wherein the second flex cable is attached to the second laterally extending arm;
wherein the one or more motor elements is a voice coil motor assembly;
wherein the voice coil motor assembly includes a flat-shaped voice coil motor;
wherein a voice coil motor flex cable is electrically coupled to the voice coil motor which is also electrically coupled to a portion of the first or second flex cables;
wherein the voice coil motor flex cable is electrically coupled to the portion of the first or second flex cables via a clamping force provided by the top flexure spring being attached to the head carriage assembly wherein portions of the voice coil motor flex cable and the portions of the first or second flex cables overlap each other between the top flexure spring and the head carriage assembly.

12. An actuator assembly for use in a tape drive enclosure comprising:
a base;
at least one coarse actuator shaft mounted on a top portion of the base;
an actuator base slidably adapted to travel along the at least one actuator shaft;
a head carriage assembly attached to the actuator base wherein the head carriage assembly includes a magnetic head;
first and second laterally extending arms on corresponding opposite sides of the magnetic head, the first and second laterally extending arms extending substantially parallel to a tape travel path along respective regions of the tape travel path immediately adjacent to laterally extending portions of the laterally extending arms;
first and second flex cables attached to the head carriage assembly and electrically coupled to the magnetic head;
a top flexure spring;
a bottom flexure spring;
wherein the top flexure spring laterally secures top portions of the actuator base to top portions of the head carriage assembly;
wherein the bottom flexure spring laterally secures bottom portions of the actuator base to bottom portions of the head carriage assembly;
wherein the top and bottom flexure springs are laterally aligned with a center line of the head carriage assembly;
wherein a first portion of the first flex cable is attached to the first laterally extending arm such that the first portion of the first flex cable is substantially parallel to the tape travel path along a region of the tape travel path immediately adjacent the first portion; and
wherein a second portion of the second flex cable is attached to the second laterally extending arm such that the second portion of the second flex cable is substantially parallel to the tape travel path along a region of the tape travel path immediately adjacent the second portion;
wherein distal ends of the laterally extending portions of the laterally extending arms and distal ends of the first and second portions of the first and second flex cables are oriented inward relative to a plane defined by the tape travel path in the region of the tape travel path immediately adjacent the magnetic head.

13. The actuator assembly as recited in claim 12 wherein the actuator base is U-shaped.

14. The actuator assembly as recited in claim 13 wherein the head carriage assembly is located inside the U-shaped portion of the actuator base.

15. The actuator assembly of claim 12 wherein the distal ends of the laterally extending portions of the laterally extending arms and distal ends of the first and second portions of the first and second flex cables are oriented approximately 10 degrees inward relative to a plane defined by the tape travel path in the region of the tape travel path immediately adjacent the magnetic head.

16. The actuator assembly as recited in claim 12 wherein the top and bottom flexure springs each include at least one set of opposing ribs that extrude perpendicular from opposing lateral sides of the top and bottom flexure springs.

* * * * *